United States Patent
Younessian

(10) Patent No.: US 12,295,081 B2
(45) Date of Patent: May 6, 2025

(54) VIDEO DISPLAY ENVIRONMENTAL LIGHTING

(71) Applicant: Comcast Cable Communications, LLC, Philadelphia, PA (US)

(72) Inventor: Ehsan Younessian, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 334 days.

(21) Appl. No.: 17/569,822

(22) Filed: Jan. 6, 2022

(65) Prior Publication Data

US 2023/0217568 A1 Jul. 6, 2023

(51) Int. Cl.
| | |
|---|---|
| H05B 47/105 | (2020.01) |
| G06V 40/16 | (2022.01) |
| G10L 15/22 | (2006.01) |
| G10L 25/57 | (2013.01) |

(52) U.S. Cl.
CPC ........... *H05B 47/105* (2020.01); *G06V 40/16* (2022.01); *G10L 15/22* (2013.01); *G10L 25/57* (2013.01); *G10L 2015/223* (2013.01)

(58) Field of Classification Search
CPC ...... H05B 47/11; H05B 47/115; H05B 47/12; H05B 47/125; H05B 47/155; H05B 47/14; H05B 47/135
See application file for complete search history.

(56) References Cited

U.S. PATENT DOCUMENTS

| | | |
|---|---|---|
| 4,807,031 A | 2/1989 | Broughton et al. |
| 5,189,412 A | 2/1993 | Mehta et al. |
| 5,655,945 A | 8/1997 | Jani |
| 6,014,184 A | 1/2000 | Knee et al. |
| 6,166,496 A | 12/2000 | Lys et al. |
| 6,415,438 B1 | 7/2002 | Blackketter et al. |
| 6,564,108 B1 | 5/2003 | Makar et al. |
| 6,611,297 B1 | 8/2003 | Akashi et al. |

(Continued)

FOREIGN PATENT DOCUMENTS

| | | |
|---|---|---|
| EP | 2851894 A1 | 3/2015 |
| GB | 2464123 A | 4/2010 |

(Continued)

OTHER PUBLICATIONS

"ZigBee RF4CE Overview and Technical Summary", ZigBee Alliance, 2012.

(Continued)

*Primary Examiner* — Wilson Lee
(74) *Attorney, Agent, or Firm* — Banner & Witcoff, Ltd.

(57) ABSTRACT

Systems, apparatuses, and methods are described for intelligent control of video display backlighting that provides environmental lighting illumination of an area behind a video display device, such as on a wall behind a video display. The environmental lighting illumination may be based on recognizing images (e.g., objects, patterns, faces, colors, etc.) in video content being displayed via the video display device, recognizing audio (e.g., words, sounds, voices, etc.) in audio content being output in association with video content being displayed via the video display device, and/or recognizing other triggers such as commands associated with video content.

36 Claims, 11 Drawing Sheets

(56) References Cited

U.S. PATENT DOCUMENTS

| | | |
|---|---|---|
| 6,698,020 B1 | 2/2004 | Zigmond et al. |
| 6,742,188 B1 | 5/2004 | Del Castillo |
| 7,071,897 B2 | 7/2006 | Bronson |
| 7,180,529 B2 | 2/2007 | Covannon et al. |
| 7,269,843 B2 | 9/2007 | Yamaguchi et al. |
| 7,316,487 B2 | 1/2008 | Hirata et al. |
| 7,369,903 B2 | 5/2008 | Diederiks et al. |
| 7,616,262 B2 | 11/2009 | Eves et al. |
| 7,752,642 B2 | 7/2010 | Lemmons |
| 7,932,953 B2 | 4/2011 | Gutta et al. |
| 7,965,050 B2 | 6/2011 | Nieuwlands |
| 8,477,948 B2 | 7/2013 | Shon et al. |
| 8,576,340 B1 | 11/2013 | Li et al. |
| 8,750,793 B2 | 6/2014 | Tysowski |
| 8,788,080 B1 | 7/2014 | Kallai et al. |
| 8,856,535 B2 | 10/2014 | Wolcott et al. |
| 8,878,991 B2 | 11/2014 | Cook |
| 8,922,124 B2 | 12/2014 | Reed et al. |
| 9,084,312 B2 | 7/2015 | Cook |
| 9,866,924 B2 | 1/2018 | Grant et al. |
| 10,390,078 B2 | 8/2019 | Zhang et al. |
| 10,423,632 B2 | 9/2019 | Armstrong et al. |
| 10,554,435 B2 | 2/2020 | Dorrendorf et al. |
| 11,281,164 B1* | 3/2022 | Richards ............... G04G 9/00 |
| 2002/0038157 A1 | 3/2002 | Dowling et al. |
| 2002/0056087 A1 | 5/2002 | Berezowski et al. |
| 2002/0171378 A1 | 11/2002 | Morgan et al. |
| 2003/0057884 A1 | 3/2003 | Dowling et al. |
| 2003/0061607 A1 | 3/2003 | Hunter et al. |
| 2003/0081834 A1 | 5/2003 | Philomin et al. |
| 2003/0149975 A1 | 8/2003 | Eldering et al. |
| 2003/0149980 A1 | 8/2003 | Hassell et al. |
| 2004/0015983 A1 | 1/2004 | Lemmons |
| 2004/0032536 A1 | 2/2004 | Islam et al. |
| 2004/0070565 A1* | 4/2004 | Nayar ................. G06V 10/60 345/156 |
| 2004/0117840 A1 | 6/2004 | Boudreau et al. |
| 2005/0028208 A1 | 2/2005 | Ellis et al. |
| 2005/0078087 A1 | 4/2005 | Gates et al. |
| 2005/0223237 A1 | 10/2005 | Barletta et al. |
| 2006/0064720 A1 | 3/2006 | Istvan et al. |
| 2006/0100880 A1 | 5/2006 | Yamamoto et al. |
| 2006/0174275 A1 | 8/2006 | Gutta |
| 2006/0225088 A1 | 10/2006 | Gutta |
| 2007/0033533 A1 | 2/2007 | Sull |
| 2007/0133212 A1 | 6/2007 | Lin et al. |
| 2007/0157260 A1 | 7/2007 | Walker |
| 2007/0174773 A1 | 7/2007 | Abernethy et al. |
| 2007/0242162 A1 | 10/2007 | Gutta et al. |
| 2008/0062196 A1 | 3/2008 | Rackham |
| 2008/0235200 A1 | 9/2008 | Washington et al. |
| 2009/0046477 A1 | 2/2009 | Salters |
| 2009/0094628 A1 | 4/2009 | Lee et al. |
| 2009/0123086 A1 | 5/2009 | Iwanami et al. |
| 2009/0150925 A1 | 6/2009 | Henderson |
| 2009/0175536 A1 | 7/2009 | Gutta et al. |
| 2009/0193455 A1 | 7/2009 | Ahn et al. |
| 2009/0219305 A1 | 9/2009 | Diederiks et al. |
| 2009/0249428 A1 | 10/2009 | White et al. |
| 2010/0177247 A1 | 7/2010 | Sekulovski et al. |
| 2010/0213873 A1 | 8/2010 | Picard et al. |
| 2010/0213876 A1 | 8/2010 | Adamson et al. |
| 2010/0238664 A1 | 9/2010 | Steenbergen |
| 2010/0244745 A1 | 9/2010 | Wendt |
| 2010/0262336 A1 | 10/2010 | Rivas et al. |
| 2010/0265414 A1 | 10/2010 | Nieuwlands |
| 2010/0284612 A1 | 11/2010 | Peters |
| 2010/0320819 A1 | 12/2010 | Cohen et al. |
| 2011/0013075 A1* | 1/2011 | Kim ................. H04N 7/147 348/370 |
| 2011/0125788 A1 | 5/2011 | Joo et al. |
| 2011/0125790 A1 | 5/2011 | Choi et al. |
| 2011/0190911 A1 | 8/2011 | Iwanami et al. |
| 2011/0215725 A1 | 9/2011 | Paolini |
| 2011/0291586 A1 | 12/2011 | Komagata et al. |
| 2011/0298379 A1 | 12/2011 | Jung et al. |
| 2012/0182276 A1* | 7/2012 | Kee ................. H04N 23/88 345/207 |
| 2013/0014155 A1 | 1/2013 | Clarke et al. |
| 2013/0055330 A1 | 2/2013 | Igoe |
| 2013/0093962 A1 | 4/2013 | Bruhn et al. |
| 2013/0147395 A1 | 6/2013 | Cook |
| 2013/0166777 A1 | 6/2013 | Chen et al. |
| 2013/0191745 A1 | 7/2013 | Vella et al. |
| 2013/0205212 A1 | 8/2013 | Sinha et al. |
| 2013/0215024 A1 | 8/2013 | Nakayama et al. |
| 2014/0104498 A1 | 4/2014 | Li et al. |
| 2014/0223461 A1 | 8/2014 | Hatambeiki et al. |
| 2014/0267906 A1 | 9/2014 | Mickelsen et al. |
| 2014/0273841 A1 | 9/2014 | Behin |
| 2014/0320825 A1 | 10/2014 | Kim et al. |
| 2015/0019975 A1 | 1/2015 | Morrow et al. |
| 2015/0199975 A1 | 7/2015 | Won et al. |
| 2015/0297989 A1 | 10/2015 | Nakayama et al. |
| 2017/0041644 A1 | 2/2017 | Dalrymple et al. |
| 2017/0041648 A1 | 2/2017 | Dalrymple et al. |
| 2017/0041649 A1 | 2/2017 | Dalrymple et al. |
| 2017/0083770 A1 | 3/2017 | Carlson et al. |
| 2017/0191695 A1 | 7/2017 | Bruhn et al. |
| 2017/0195717 A1 | 7/2017 | Wang et al. |
| 2017/0295404 A1 | 10/2017 | Meredith et al. |
| 2018/0103287 A1 | 4/2018 | Reichow et al. |
| 2018/0292907 A1* | 10/2018 | Katz .................. G06F 3/017 |
| 2018/0336929 A1 | 11/2018 | Filippini et al. |
| 2019/0069375 A1 | 2/2019 | Baker et al. |
| 2019/0081811 A1 | 3/2019 | Miller et al. |
| 2019/0356508 A1* | 11/2019 | Trikha .................. H03H 7/48 |
| 2020/0213662 A1 | 7/2020 | Wolcott et al. |
| 2021/0021788 A1* | 1/2021 | McNelley ............. H04N 7/15 |
| 2021/0141444 A1* | 5/2021 | Speelman ........... G02B 27/017 |
| 2021/0231951 A1* | 7/2021 | Dominguez .......... G02C 7/105 |
| 2021/0298157 A1* | 9/2021 | Olaleye ............... H05B 47/155 |
| 2021/0374391 A1* | 12/2021 | Jorasch ................ G06V 40/19 |
| 2021/0392290 A1* | 12/2021 | McNelley ........... H04N 9/3141 |
| 2021/0399911 A1* | 12/2021 | Jorasch .............. H04L 12/1822 |
| 2021/0400142 A1* | 12/2021 | Jorasch .............. H04L 65/1069 |
| 2022/0058382 A1* | 2/2022 | LiVoti ................ H04N 21/6582 |
| 2022/0116520 A1* | 4/2022 | Hsieh ................. G09G 3/2096 |
| 2022/0124226 A1* | 4/2022 | Jeong .................. H05K 1/144 |
| 2022/0155143 A1* | 5/2022 | Moeneclaey ............ G01J 1/46 |
| 2022/0217828 A1* | 7/2022 | Linnartz ............. H05B 47/175 |
| 2022/0284893 A1* | 9/2022 | Bani Hani ............ H05B 47/19 |
| 2022/0287166 A1* | 9/2022 | Zang .................. H05B 45/20 |
| 2022/0300081 A1* | 9/2022 | Eirinberg ............ G06V 40/107 |
| 2022/0300732 A1* | 9/2022 | Eirinberg ................ G06F 3/017 |
| 2022/0312572 A1* | 9/2022 | Kumar ................ H05B 47/175 |
| 2023/0068798 A1* | 3/2023 | Etchart .................. G06T 7/74 |
| 2023/0162529 A1* | 5/2023 | Zhou ................. G06V 40/193 382/103 |
| 2023/0180371 A1* | 6/2023 | Henderson ............ H05B 47/19 315/363 |
| 2023/0201517 A1* | 6/2023 | Rizkalla ................. G16H 20/70 |
| 2023/0225035 A1* | 7/2023 | Krajnc ................ H05B 47/125 315/149 |
| 2023/0262862 A1* | 8/2023 | Meerbeek ........... H05B 47/175 315/294 |
| 2023/0269852 A1* | 8/2023 | Janssen .................. H05B 47/19 315/297 |

FOREIGN PATENT DOCUMENTS

| | | |
|---|---|---|
| WO | 2005041110 A2 | 5/2005 |
| WO | 2007026283 A2 | 3/2007 |
| WO | 2007126781 A2 | 11/2007 |
| WO | 2015076623 A1 | 5/2015 |

OTHER PUBLICATIONS

"Captain Power and the Soldiers of the Future", downloaded from Wikipedia on Mar. 13, 2013, <http://en.wikipedia.org/wiki/Captain_Power>.

(56) References Cited

OTHER PUBLICATIONS

Garry Whittaker, "Let there be Ambilight—AMBX—How to get the Philip's Ambilight effect in media center without buying a new TV", Jul. 26, 2010, downloaded from <http://thedigitallifestyle.com/w/index/php/2010/07/26/let-there-be- ambilight-ambx-how-to- . . . >, 6 pages.

Ben Holmes, "VenueMagic 2.5 Show Control Software", Jan. 24, 2012, downloaded from <http://www.venuemagic.com/>, 5 pages.

"The Death of Ineffective Conferences and Presentations?", downloaded from <http://www.ambx.com/>, 3 pages, retrieved Jan. 31, 2012.

"Amblone: DIY Ambilight", downloaded from <http://amblone.com/>, 3 pages, retrieved Jan. 31, 2012.

"Philips' new 9000 series Smart LED TV offers the best full HD 3D cinematic experience", Press Information, Philips Mar. 8, 2011, 4 pages.

Thomas Ricker, "Fujikom LeDenQ Z-Wave wireless LED lightbulb is a world's first", Jan. 13, 2012, downloaded from <http://www.theverge.com/2012/1/13/2705079/wireless-LED-z-wave-fujikon-ledenq>, 19 pages.

"Energate Implements ZigBee Smart Energy to Balance the Needs of Utilities and Empower Consumers", ZigBee Success Story, 2009, 2 pages.

"Multi Color LED, Part No. 08L5015RGBC", product details, Electronix Express, 2 pages, retrieved no later than Mar. 8, 2012.

"88W8688 Integrated MAC/Baseband/RF WLAN and Bluetooth SoC Product Brief", Nov. 30, 2009, Marvell, 6 pages.

"Marvell 88EM8080/88EM8081 Digital Flyback PFC Controller for LED Lighting Applications", product overview, Aug. 2010, Marvell, 2 pages.

Partial European Search Report—EP12196159.3—Mailing date: Apr. 2, 2013.

Extended European Search Report—EP12196159.3—Mailing Date: Jun. 26, 2013.

Dec. 12, 2016—(EP) Office Action—App 12196159.3.

Feb. 12, 2020—European Extended Search Report—EP 19220170.5.

Oct. 27, 2022—EP Office Action—EP App. No. 19220170.5.

\* cited by examiner

Example Backlight Triggers and Effects

| Input Source | Trigger Type | Trigger | Effect | |
|---|---|---|---|---|
| Video | Object | Trees | Add Green to Adjacent Area; Only if Background | 801 |
| | | Computer | Add Blue to Adjacent Area; Only if Foreground | 802 |
| | | Car | Add Red to Adjacent Area; Unless Trees | 803 |
| | Location | Water | Add Blue to Entire Backlight | 804 |
| | | Desert | Add Beige to Entire Backlight | |
| | | Space | Darken Entire Backlight | 805 |
| | Facial Emotion | Anger | Add Red to Adjacent Area | |
| | | Sadness | Add Blue to Adjacent Area | |
| | | Anxiety | Add Purple to Entire Backlight | |
| | Logo | Company A | Add Company Logo Color Pattern to Entire Backlight | 806 |
| | Scene Type | Violence – 10 Seconds Ahead | Flash Red of Entire Backlight 10 Seconds Before Violence Scene | 807 |
| | | Sex – 30 Seconds Ahead | Dark Red Entire Backlight 30 Seconds Before Sex Scene | |
| Audio | Sounds | Gunfire | Flash Brightness of Adjacent Area | 808 |
| | | Guitar | Pulse Brightness of Entire Backlight | |
| | Emotion | Arousal Velocity | Increase/Decrease Brightness of Entire Backlight Corresponding to Velocity | 809 |
| Text | Topic | Politics | Add Red/White/Blue to Entire Backlight | 810 |
| | Key Term | Salad | Add Light Green to Adjacent Area | |
| | Brand Name | Company A | Add Company Logo Color Pattern to Entire Backlight | |
| Command | SCTE Stream | Command in Field X | Corresponding Backlight Pattern | 811 |

FIG. 8

VIDEO DISPLAY ENVIRONMENTAL LIGHTING

BACKGROUND

Video display devices may include one or more elements that can provide environmental illumination, for example, to shine a light on a wall behind a television.

SUMMARY

The following summary presents a simplified summary of certain features. The summary is not an extensive overview and is not intended to identify key or critical elements.

Systems, apparatuses, and methods are described for intelligently controlling video display environmental lighting to enhance presentation of a content item being presented via a video display, by providing illumination of an area (e.g., a wall) behind the video display. Environmental lighting effects may be triggered by recognition of images in the foreground and/or background of video content, recognition of sounds associated with the video content, and/or by commands associated with the video content. The environmental lighting may enhance visual and/or emotional effects of the content item, warn users of upcoming images and/or sounds (e.g., to support parental control efforts), help users more quickly identify content items that may be of interest as they are browsing different content items, and otherwise supplement presentation of content via the video display.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 8 shows an example of environmental lighting information indicating various lighting triggers and corresponding effects.

DETAILED DESCRIPTION

Figure 1:
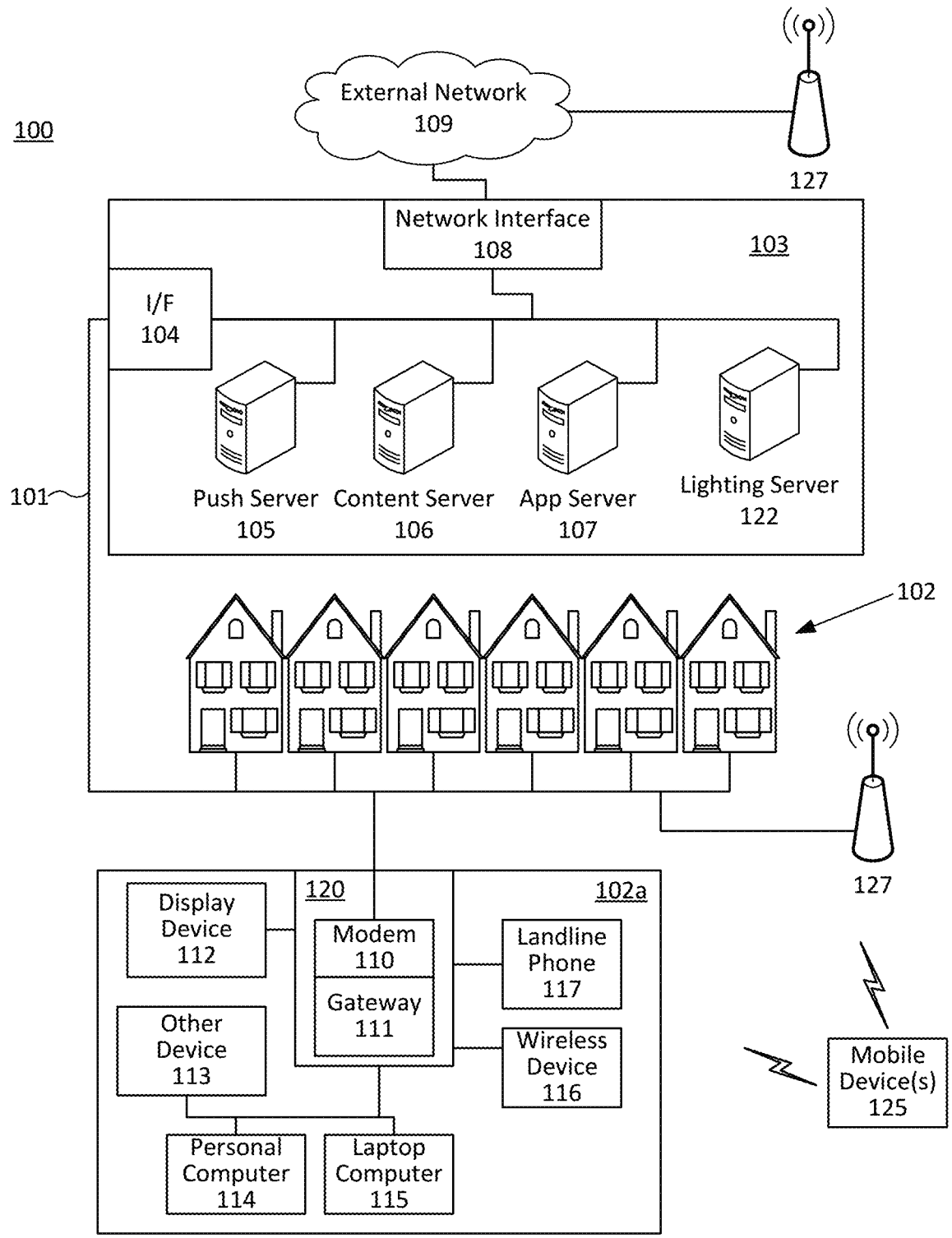
FIG. 1 shows an example communication network that may be used to implement the various features described herein.

The accompanying drawings show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107 and 122, and/or to manage communications between those devices and one or more external networks 109. The interface 104 may, for example, comprise one or more routers, base stations, optical line terminals (OLTs), termination systems (e.g., a modular cable modem termination system (M-CMTS), integrated cable modem termination systems (I-CMTS)), digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as a lighting server 122 (described below), additional push, content, and/or application servers, and/or other types of servers. Although shown separately, the push server 105, the content server 106, the application server 107, the lighting server 122, and/or other server(s) may be combined and/or server operations described herein may be distributed among servers or other devices in ways other than as indicated by examples included herein. Also or alternatively, one or more servers (not shown) may be part of the external network 109 and may be configured to communicate (e.g., via the local office 103) with other computing devices (e.g., computing devices located in or otherwise associated with one or more premises 102). Any of the servers 105-107, and/or 122, and/or other computing devices may also or alternatively be implemented as one or more of the servers that are part of and/or accessible via the external network 109. The servers 105, 106, 107, and 122, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
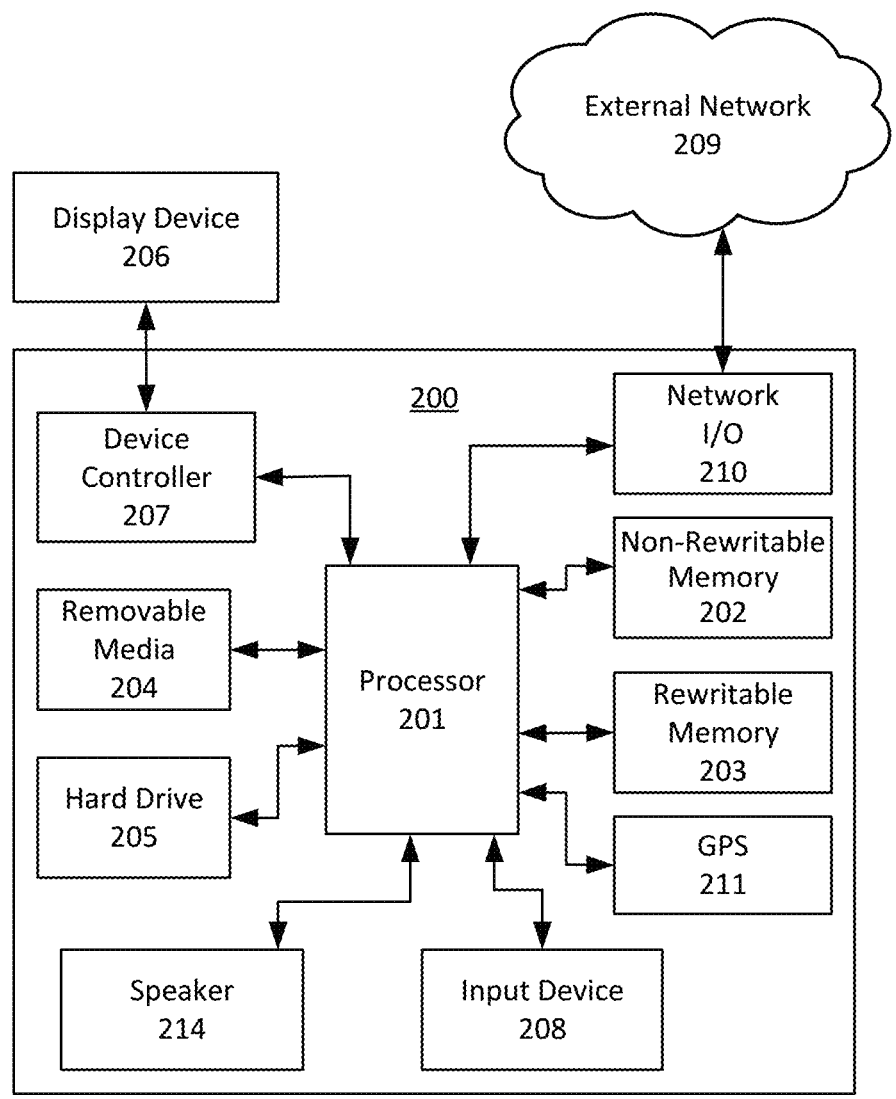
FIG. 2 shows hardware elements of an example computing device that may be used to implement the various features described herein.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., display devices, backlight devices associated with and/or attached to display devices, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200. The computing device 200 may be integrated with the display device 206, or it may be separate from the display device 206, and it may be programmed to control the output of illumination by the environmental lights 303*a-h* to provide the various features described herein.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
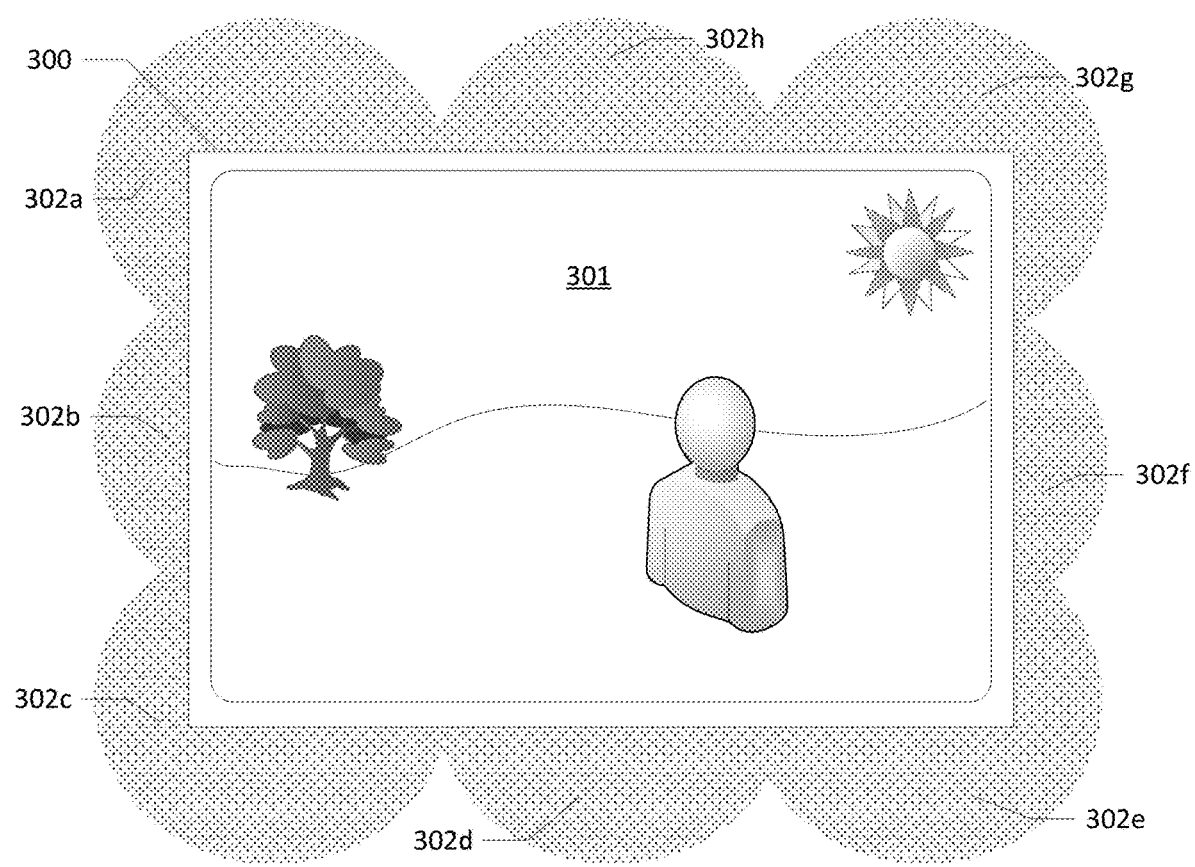
FIGS. 3A and 3B show an example of a display device and associated environmental lighting.
Figure 3B:
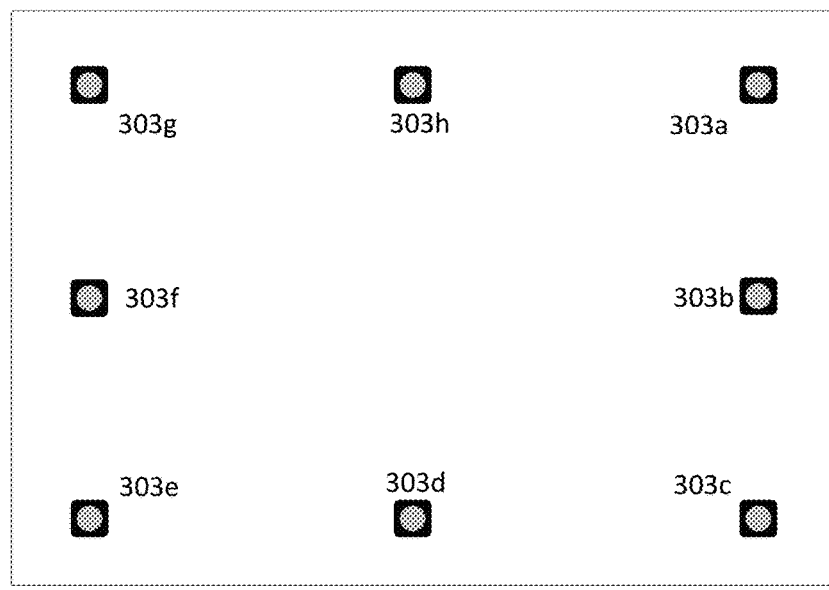

FIG. 3A shows an example of a display device 300 on which a scene 301 is shown for viewers to see, and areas of illumination 302*a-h* may be projected rearward from the display device 300 onto, for example, a wall from which the display device 300 is hanging. The areas of illumination 302*a-h* may be projected from corresponding environmental lights 303*a-h* on a rear surface of the display device 300, as shown in FIG. 3B, and may provide a backlight appearance illuminating an area behind the display device 300 (e.g., illuminating a wall on which the display device 300 hangs). The environmental lights 303*a-h* may be of any desired type of light source, such as light-emitting diodes (LEDs). The environmental lights 303*a-h* may be multicolor LEDs, capable of emitting different colors of light. While eight (8) environmental lights 303*a-h* are shown in FIG. 3B placed around a periphery of the rear surface of the display device 300, any number of light sources may be used, and they may be placed in any desired location on (or near) the display device 300. The environmental lights 303*a-h* need not be affixed to the display device 300. For example, environmental lights 303*a-h* may be separate lighting devices that are proximate to the display device 300 (or anywhere else in the room or the premises 102*a*), and which illuminate the wall (or other area) behind the display device 300. Such separate lighting devices may be in addition to lighting devices attached to the rear of the display device 300.

Figure 4:
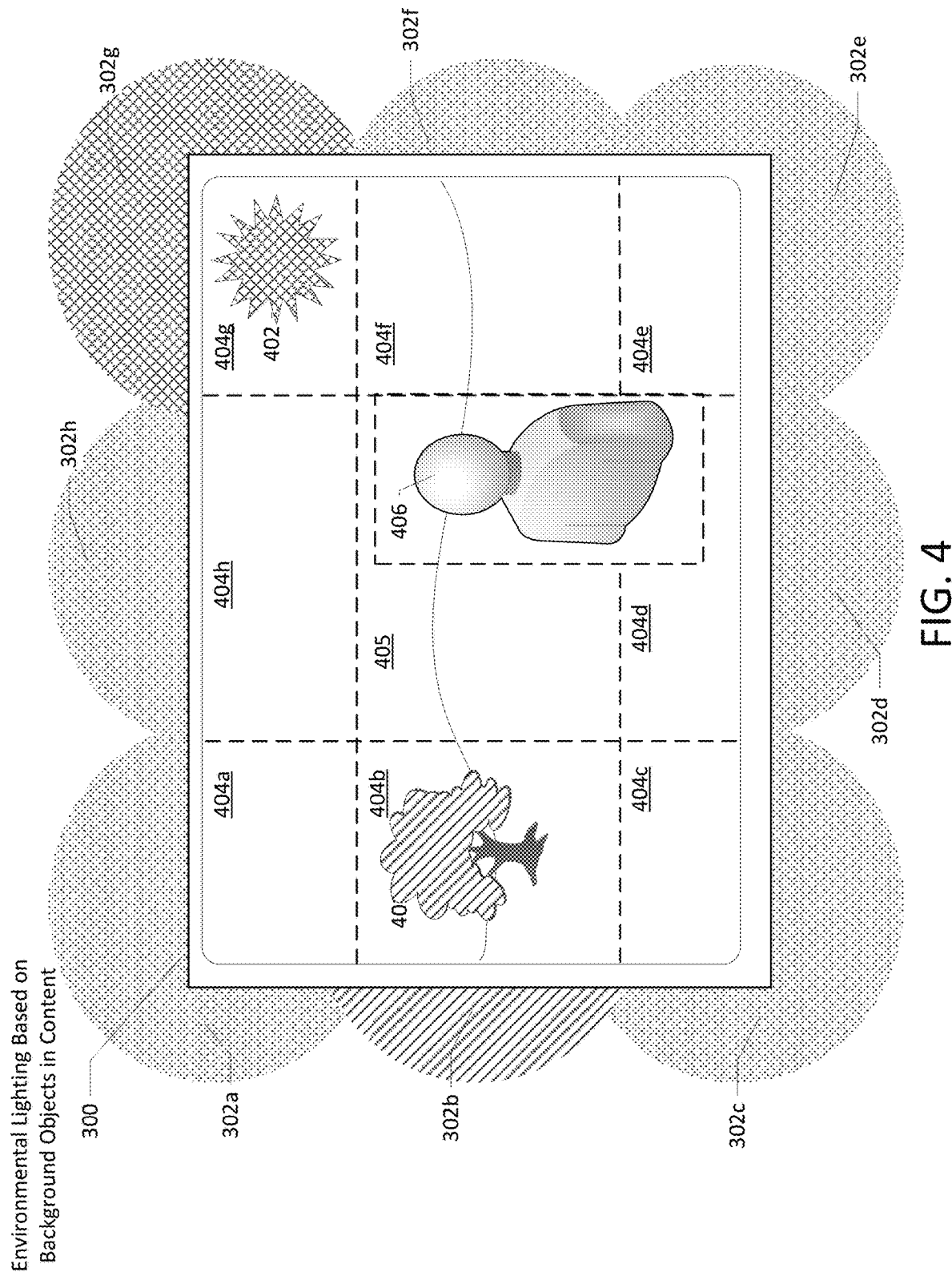
FIG. 4 shows an example of a display device and environmental lighting based on recognized background objects in video content.

The environmental lights 303*a-h* may be used to enhance the visual effect of the display device 300. Projecting the illumination 302*a-h* beyond the display border of the display device 300 (e.g., behind and/or adjacent to the display device 300) may allow the display device 300 to convey a larger visual impression on the viewer, thereby enhancing the visual impression created by the display device. The environmental lights 303*a-h* may emit colors that correspond to colors found in adjacent areas of the display device 300's display screen. As shown in FIG. 4, the environmental lighting illumination 302*b* may be green in color (represented as cross-hatching), to match the color of a tree 401 that appears in an area of the display screen that is adjacent the area of the environmental lighting illumination 302*b*. Similarly, if the displayed scene 301 comprises a yellow sun 402 in its upper-right corner, an adjacent environmental lighting illumination 302*g* may be yellow in color (represented as double cross-hatching). Matching environmental lighting colors to nearby areas of the display screen may help the display device 300 project a larger visual impression. To support this, the display device 300's display area may be divided into areas corresponding to the areas of environmental lighting illumination 302*a-h*, and color values of each area may be used to determine a color value for a corresponding environmental lighting illumination 302*a-h*. As shown in FIG. 4, the display screen may be divided into eight (8) regions 404*a-h*, respectively corresponding to environmental lights 303*a-h* and areas of environmental lighting illumination 302*a-h*. The color corresponding to a particular region 404*a-h* may be based on an average of pixel color values for all pixels in the region. For example, the environmental lighting illumination 302*a* may comprise a color that is an average of pixel color values for pixels in corresponding display region 404*a*.

There may be some regions that do not correspond with an environmental light. For example, the central region 405 in FIG. 4 may be designated as an area that will not affect the environmental lighting.

The environmental lighting may be configured to ignore foreground objects, and rely on background objects. As shown in FIG. 4, the tree 401 and sun 402 may be recognized as background objects, and their corresponding environmental illumination 302*b*, 302*g* may comprise matching colors. But a foreground object, such as person 406, might not have an effect on the environmental lighting. This different treatment of foreground and background objects may help the environmental lighting convey a visual impression of background lighting. The separation of foreground and background objects may be accomplished using any desired video processing and/or object tracking technique. Foreground objects may be larger, more centrally located, brighter, and/or may have higher degrees of movement than background objects. Accordingly, video processing may identify video objects in the scene 301, and distinguish foreground objects from background objects based on any combination of these characteristics. In FIG. 4, if the person 406 is determined to be a foreground object, and the system is configured to only use background objects for environmental lighting color control, the area of illumination 302*d*, corresponding to area 404*d*, might ignore the color values of the person 406, and may instead have a color that is based on the other portions of the area 404*d* that are not part of the person 406. By controlling the environmental lighting based on background objects, and not foreground objects, the environmental lighting can be seen as a natural continuation of video being displayed.

Alternatively, the environmental lighting may be configured to ignore background objects, and may rely on foreground objects. The same principles discussed above would apply, but in reverse. For example, the tree 401 and sun 402 background objects might be ignored, and the areas of illumination 302*b* and 302*g* might have a color that is based on other portions of the regions 404b and 404g that are not those background objects. The area of illumination 302d, corresponding to region 404d, might be colored based on the colors found in the person 406 foreground object. The coloring of that area 302d may be determined by averaging pixel color values of the person 406, or the pixel color values of the part of the person 406 that appears within region 404d (e.g., the system may ignore color values of parts of the person 406 that are not in the region 404d).

Figure 5:
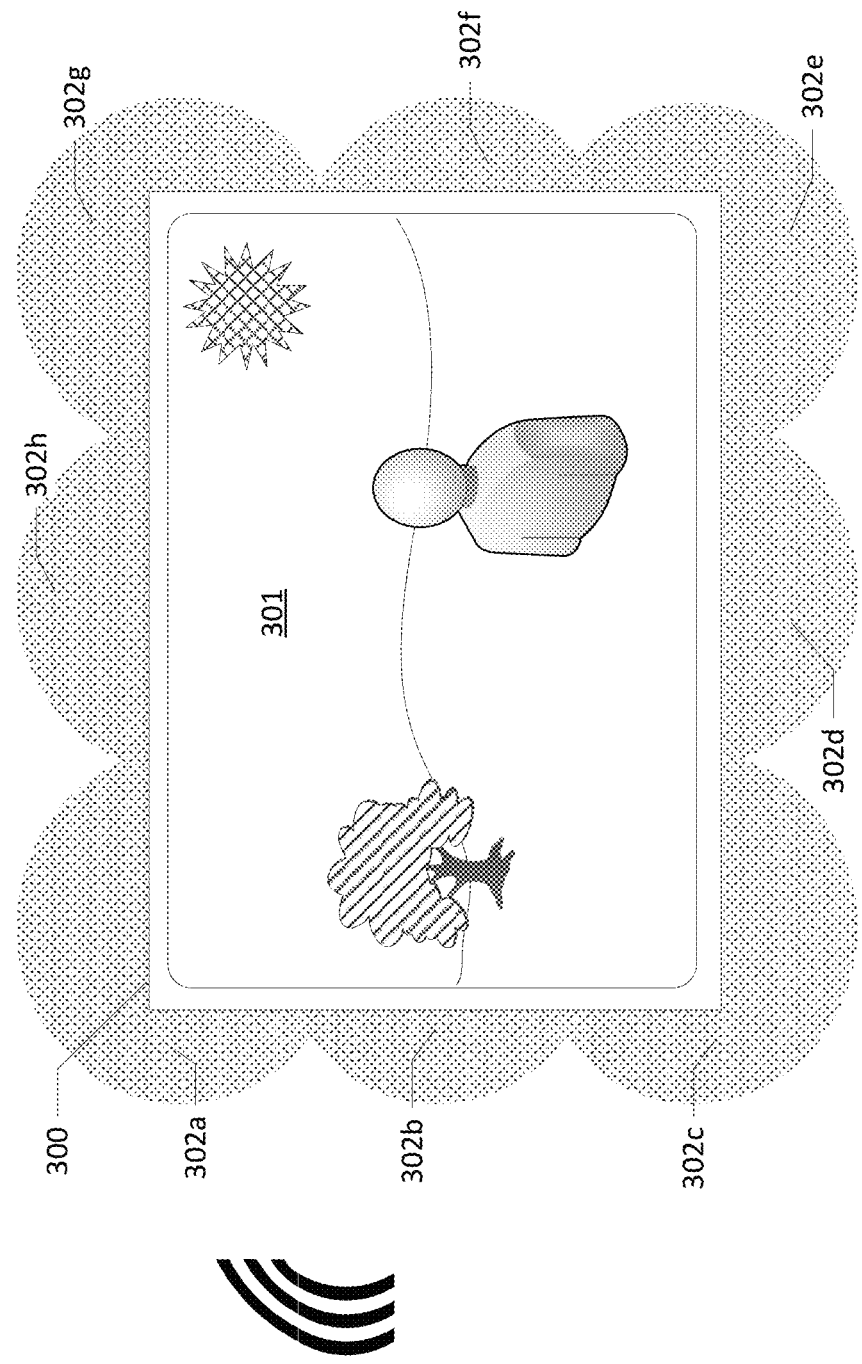
FIG. 5 shows an example of a display device and environmental lighting based on recognized audio patterns in content.

As shown in FIG. 5, the environmental lighting may be based on audio pattern recognition, such as identifying sounds (e.g., words, phrases, noises, increases and/or decreases in volume, etc.) in audio associated with the scene 301 (e.g., audio that is played before, during, and/or after the scene 301), and in aural velocity of these sounds (e.g., whether there is an increasing crescendo of audio volume and suspenseful music). For example, the audio in a scene 301 may comprise sounds that are associated with a high degree of tension or distress (e.g., accelerating musical soundtrack, increasing volume and/or pitch, recognized words of stress, etc.), and that tension or distress may be an emotion that is mapped to a particular environmental lighting effect. A stressful action scene in a movie may result in a pulsing bright environmental light before or during the scene. Additional details of audio triggers will be discussed further below with regard to FIG. 8.

Figure 6:
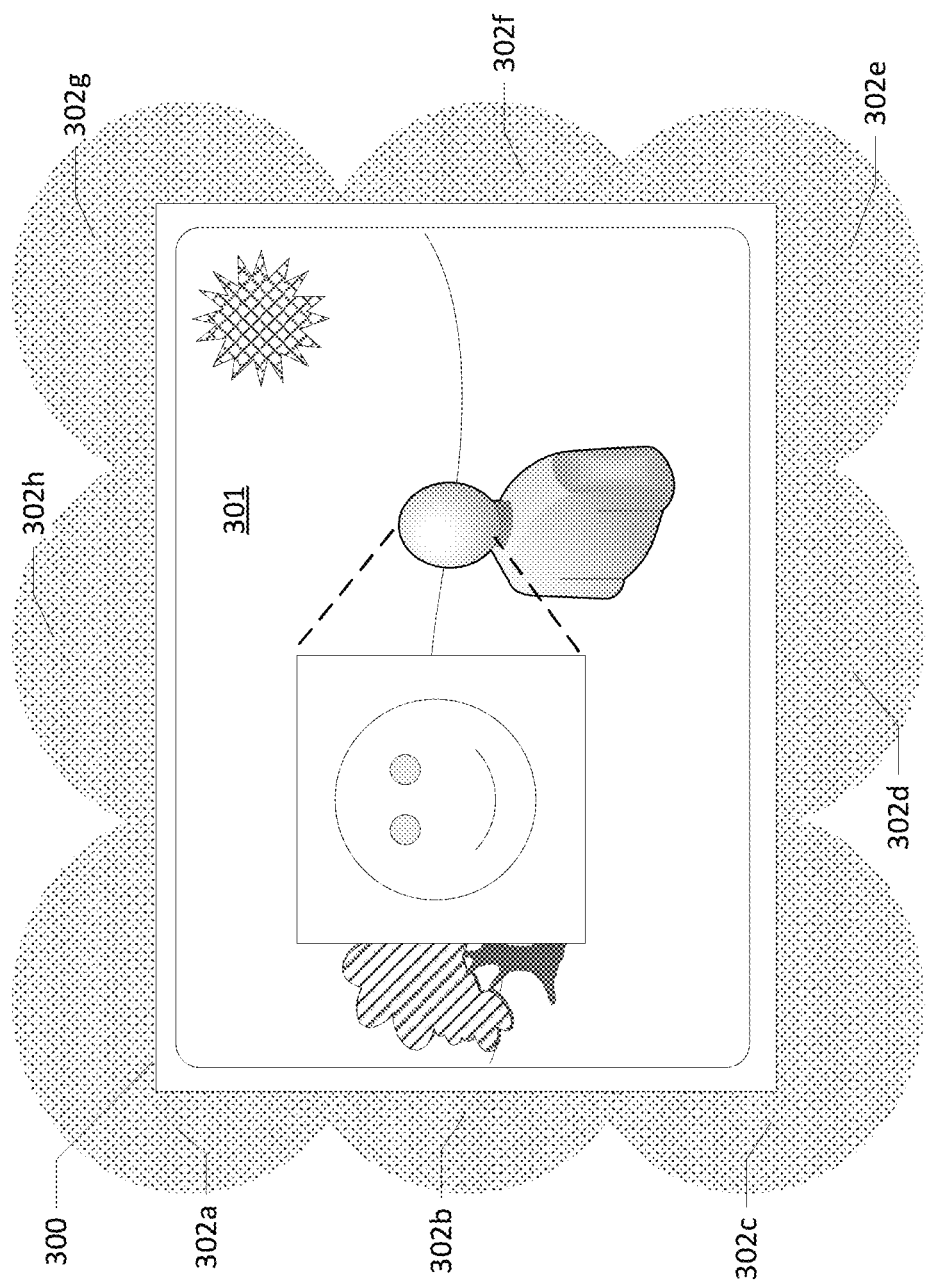
FIG. 6 shows an example of a display device and environmental lighting based on recognized faces in video content.

As shown in FIG. 6, the environmental lighting may be based on object and/or facial recognition. For example, a particular character in a movie may be associated with a yellow color scheme, and the environmental lighting may illuminate using this yellow color scheme based on that character's face being recognized in the scene 301. Any desired facial and/or object recognition technique may be used. Additional details of lighting triggers will be discussed further below with regard to FIG. 8.

Figure 7:
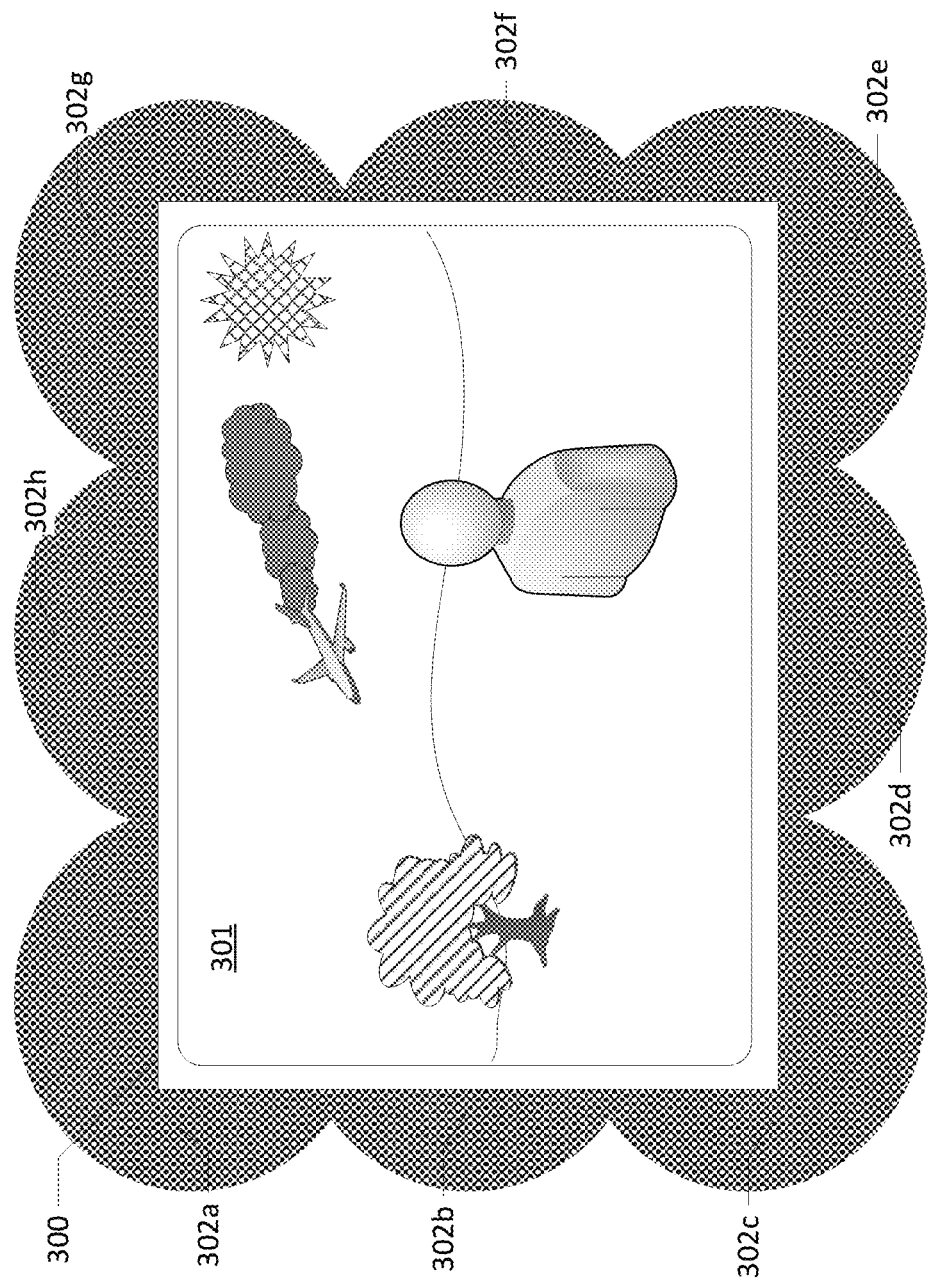
FIG. 7 shows an example of a display device and advanced warning environmental lighting.

The environmental lighting may be used to provide viewers with a warning of upcoming scenes. For example, in FIG. 7, the environmental lighting may appear in a flashing red color to warn the viewer that an upcoming violent plane crash scene is about to occur. This advance warning may be useful for parental control purposes, and may be accomplished by processing the video content prior to its actual output by the display device 300. For example, the display device 300 (or an associated device, such as a DVR or computer 114) may buffer an incoming stream of audiovideo content in any of its memory storage, and may perform environmental lighting processing using the buffered content prior to its output.

FIG. 8 shows an example of environmental lighting information 800 having entries indicating lighting triggers and their corresponding effects. The environmental lighting information 800 may be stored (e.g., as a table, a file, etc.) in one or more memories associated with the lighting server 122, display device 112/300, DVR, computer 114/115, and/or any device that is associated with output of a content item via a display device 112/300 that is associated with one or more environmental light sources, and may be consulted to control lighting and/or to send lighting control commands associated with output of a content item. There may be various types of lighting triggers.

Lighting triggers may be based on computerized image recognition of video objects and patterns in video content. Predetermined objects may be associated with different environmental lighting effects in the environmental lighting information 800, and a computerized object recognition process may identify image objects in the video content. For example, a computerized object recognition process may recognize a tree in a video frame of a movie that a user is watching. A table entry 801 may indicate that recognition of a tree in a video frame results in a green backlighting effect in an adjacent area of the environmental lighting. As shown in FIG. 4, the tree 401 may trigger area of illumination 302b to be green in color, to match the color of the tree 401.

The environmental lighting information 800 may indicate that the effect is to occur only if the recognized object is deemed to be a background object. The example entry 801 indicates that a recognized tree object in a video frame will cause the green environmental lighting effect only if the recognized tree is determined to be a background object—if the tree is determined to be a foreground object, the entry 801 would not result in the green environmental lighting effect. Limiting the environmental lighting to background objects may help with consistency, if the environmental lighting is desired to be used to help establish a visual environment of a scene in the content item. The green environmental lighting glow adjacent to the tree 401 may help convey a larger sense of video display environment to the user.

Similarly, the environmental lighting information 800 may indicate that a recognized object will trigger a corresponding environmental lighting effect only if the recognized object is determined to be a foreground object. In the entry 802, a recognized computer will cause a blue environmental lighting effect in an area adjacent to the onscreen computer only if the computer is determined to be a foreground object. Limiting the environmental lighting to foreground objects may help visually emphasize the foreground objects for the user.

There may also be a hierarchy of objects for environmental lighting. For example, an entry 803 may indicate a relative priority for multiple objects should they be recognized in the same frame or the same region of a frame. The environmental lighting information 800 includes an example in which a recognized car will result in a red backlight adjacent to the car, unless there is also a tree in the same region as the car. This hierarchy may be useful in organizing the environmental lighting effect, to resolve potential conflicts and confusion that may arise if multiple objects would otherwise cause an inconsistent mix of environmental lighting. This hierarchy is not limited to recognized objects, and any of the lighting triggers described herein may be given relative priority over other triggers to manage the overall environmental lighting effect.

The video trigger need not be a specific object. For example, an entry 804 may indicate that a recognized location may serve as a lighting trigger. The location may be determined, for example, by recognizing landmark image objects in the video and/or receiving location/GPS data associated with the video, and may result in different environmental lighting effects. A water location may result in a blue environmental lighting effect. Various object patterns may be defined to indicate landmarks, and may be detected. Visual patterns of locations such as a studio, baseball field, beauty salon, etc. may be defined, and environmental lighting colors may be used to match those patterns after they are recognized in the video.

Facial recognition may also be used as a lighting trigger. The environmental lighting information 800 may comprise an entry indicating that the face of a particular celebrity or character is a lighting trigger to cause a corresponding environmental lighting color to appear. Facial expressions may also be used as lighting triggers, and a machine learning model may be trained to recognize different types of expressions in recognized human faces. Entry 805 indicates that a particular facial expression or emotion (e.g., anger) may result in the addition of red environmental lighting to an area adjacent to the detected facial expression. Facial expressions for different emotions, such as sadness and anxiety, may result in environmental lighting of different colors, such as blue and purple respectively. Environmental lighting can be used to help enhance the emotional effect of visual scenes, and can help users more quickly understand the scene if the user is browsing content items (e.g., "channel surfing").

Symbols, such as corporate logos, may be lighting triggers. The environmental lighting information 800 may comprise an entry 806 indicating that a particular company's logo appearing onscreen will trigger adding an environmental lighting color pattern using the company's brand colors. The environmental lighting may assist with capturing a user's attention when the company's advertisement, logo, name, and/or product appears onscreen, and the additional environmental lighting feature may be offered as an enhanced advertising feature. A content provider may track a quantity of instances that a company's brand colors where displayed in this manner, and may send a corresponding report indicating the instances. The report may be used for audience monitoring purposes, brand exposure purposes, generation of advertising revenue by charging a fee for each impression/instance of advertising backlighting, etc.

Scene type may be a lighting trigger. Metadata associated with the video content may include semantic labels classifying different portions of the video content as being of a certain type, and these semantic labels may be identified by a light controlling device (e.g., device controller 207, computing device 200, etc.). For example, the metadata may comprise a semantic label code indicating that a portion from 10:05 to 10:55 of a video program contains violence, and the environmental lighting may be triggered to indicate such a scene. The indication can occur simultaneously with the violence, and/or it can be provided in advance so that a parent may have time to take appropriate parental control action (e.g., pause, change channels to a different program, have a child look elsewhere, etc.). Entry 807 indicates that if a violent scene is detected in the video of the content item, the environmental lighting may flash red for 10 seconds before the scene appears on the video display 300. This advance timing is possible if the video content is buffered and processed prior to its output by the video display 300. For example, video content may be buffered in a memory 203 prior to output, and a processor 201 may perform image recognition on the buffered video content to recognize any of the lighting triggers discussed above. The same is true for all of the lighting triggers discussed herein—the triggers may be detected in buffered content, ahead of actual display of corresponding content, to provide users with advance notice of the upcoming scene, object, etc. The classification of a scene may result from a combination of lighting triggers, such as image recognition detecting an explosion, and audio recognition detecting the sound of gunfire. The generation of the semantic labels may be performed using any desired process of recognizing and classifying content.

Lighting triggers may also be found in audio content. For example, certain sound patterns can be mapped to certain environmental lighting effects. Entry 808 indicates that the sound of gunfire may trigger a flash of bright light in a backlight area adjacent to a source of the gunfire (e.g., perhaps working in conjunction with image object recognition, the visual image of a firearm may be recognized with the visual processing discussed above). Musical types (e.g., guitar instrumentals), specific songs, and other sounds may be designated as lighting triggers to cause different environmental lighting effects based on the sounds. These environmental lighting effects may enhance the aural experience for the user.

Similar to the facial expressions and emotions discussed above, entry 809 may indicate that an audio emotion may be used as a lighting trigger. For example, a rising crescendo of dramatic music may indicate a rising aural velocity, and the corresponding environmental lighting effect may comprise an increased brightness commensurate with the increasing dramatic music. Deep learning models may be used to process audible speech to detect an emotion in a human speaker's voice, a piece of music, or other audio (indeed, such models may be used for any of the backlight triggers described herein). Different emotions, such as anger, alarm, astonishment, delight, happiness, sadness, etc. may be mapped to different colors, and the environmental lighting may illuminate with a color corresponding to a detected emotion in a human's voice. For example, if a character in a movie excitedly cheers a winning outcome of a sporting match, that excitement may be detected in detected words ("Awesome!") and voice tones (loud, exuberant voice), and a color that has been mapped to the emotion of "excitement" (e.g., orange) may appear in the environmental lighting. The use of environmental lighting to visually convey emotion may be helpful in making a scene more immersive for a viewer, and/or helping a user quickly understand a scene upon viewing a program. The environmental lighting may help convey emotion to a user who has difficulty hearing, or who has the audio volume turned down below a threshold.

Text may also be used as a lighting trigger. Entry 810 indicates that a particular topic, such as "Politics," may result in a red, white, and blue environmental lighting pattern. The topic may be detected from spoken audio in the content item, recognized words from a closed-captioning feed for the content item, and/or text appearing on screen in the content item.

Other conditions in a content item may be detected and used as lighting triggers. For example, in a sporting event, the environmental lighting control device may change the environmental lighting illumination based on events occurring in the sporting event. The environmental lighting illumination may change colors to match team jersey colors of a team that accomplishes a goal in the sporting event, such as scoring points, going on offense or defense, taking the lead, etc. Such triggers may be based on the environmental lighting control device being programmed to detect such conditions by, for example, conducting image analysis to recognize a scoreboard, the jersey colors of the team possessing the ball, etc. Such triggers may also be based on metadata accompanying the content item. For example, various metadata sources may provide real-time statistical data on the progress of a sporting event, and the environmental lighting control device may obtain a data feed corresponding to a content item that the user is currently viewing, and may cause environmental lighting illumination to occur based on the data feed.

The environmental lighting may be configured via environmental lighting commands that may be received with the video content. Entry 811 may indicate that a data stream, such as an SCTE-35 (Society of Cable and Telecommunications Engineers standard) stream, may carry commands to cause the display device 300 to perform any of the environmental lighting features described herein. An environmental lighting command may determine the regions 404*a-h* corresponding to the environmental lights 303*a-h* of the display device 300. The data stream may include a variety of commands corresponding to different types of display devices 300 (e.g., those with greater or fewer light sources, brighter or dimmer ones, different color palettes, etc.). Environmental lighting commands may be sent along with a content item, and may be inserted into a stream comprising the content item. For example, a video stream carrying a movie may include environmental lighting commands as part of the video stream. If environmental lighting trigger detection is performed prior to a user viewing session, the environmental lighting commands may indicate one or more environmental lighting triggers that have already been detected. For example, if a tree is detected in an upper corner of the image at the 09:30 time within a movie, the environmental lighting commands may include information indicating that a tree is found at that time and location. Having such commands may simplify the process of environmental lighting during the actual viewing session, and may allow for fewer processing resources to be needed at that time.

The lighting triggers discussed above may be combined for various effects as desired. For example, an entry may indicate a lighting trigger comprising a combination of a recognized object (e.g., a firearm) and sound (e.g., a sound of gunfire), and the environmental lighting effect may be a flashing white backlight adjacent to a region in which the object appears. Groups of one or more lighting triggers may be mapped to emotions, and the emotions may be mapped to colors. For example, recognition of shouting characters in audio and facial expressions of furrowed eyebrows and tears may be associated in the table with an "anger" emotion, and that emotion may be mapped to a red environmental lighting color. Similarly, facial recognition of a smile and embracing characters, with audio recognition of the spoken words "I love you," may be associated in the table 800 with a "happy" emotion, which may be mapped to a yellow environmental lighting color.

The various lighting triggers and effects may be under the control of an environmental lighting control device, which may be variously implemented using one or more of the various devices described herein. The environmental lighting control device may be implemented on a computing device proximate to the display 300, such as personal computer 115, laptop computer 115, gateway 111, a set-top box, digital video recorder, removable computing device attached to display 300, or any other desired computing device. The environmental lighting control device may send commands to the backlights 303a-h via wireless communications (e.g. wi-fi, cellular phone connection, BLUETOOTH, etc.) and/or wired communications (e.g., USB line, HDMI connection, etc.). The environmental lighting control device may be implemented in the display 300 itself, in which case the commands may be sent via any desired local communication, such as an internal communications line or bus. The environmental lighting control device may be implemented on a remote device, such as lighting server 122, and the commands may be sent via link 101, via Internet communications, etc.

Figure 9A:
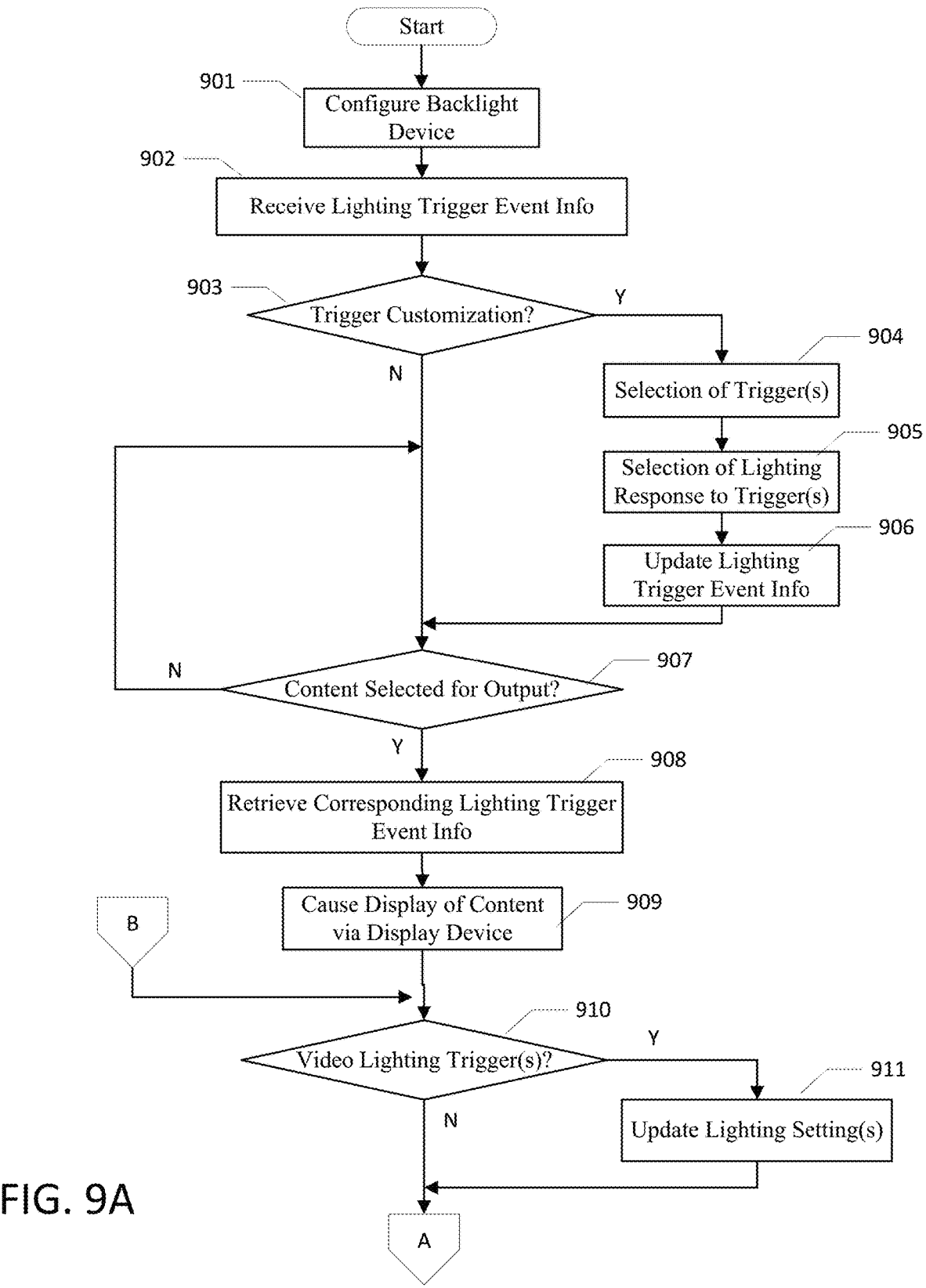
FIGS. 9A and 9B show an example of a method for controlling environmental lighting.
Figure 9B:
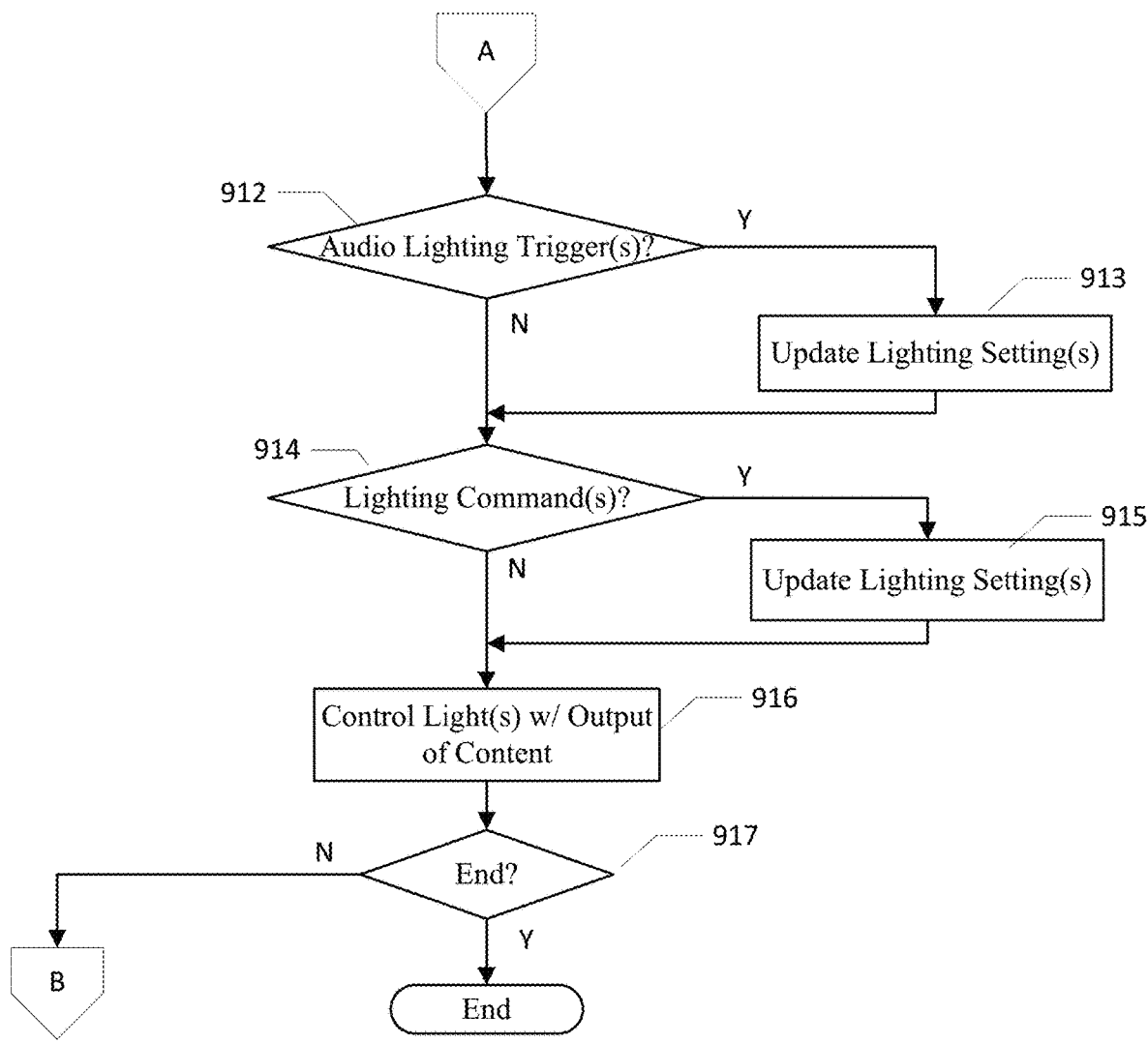

FIGS. 9A-B show an example algorithm that may be performed by an environmental lighting control device. One, some, or all steps of the example algorithm of FIGS. 9A-B, or portions thereof, may be performed by one or more other computing devices (e.g., lighting server 122, gateway 111, personal computer 114, laptop computer 115, display device 112, etc.). One, some, or all steps of the example algorithm of FIGS. 9A-B may be omitted, performed in other orders, and/or otherwise modified, and/or one or more additional steps may be added.

In step 901, an environmental lighting control device may be configured for operation. The configuration may occur, for example, when a user installs a video display device 300 and/or an associated environmental lighting control device. The configuration may comprise receiving information indicating the type of video display device 300 being used, and the type of environmental light(s) that are associated with the video display device 300. The information may indicate the number of environmental lights 303, a location for each environmental light (e.g., position on a rear surface of a display, location near the display if separate from the display, etc.), the range of colors that each environmental light is capable of illuminating, the power level/brightness of each environmental light, the electrical and control characteristics (e.g., 5V LED, command codes for lighting combinations of different colors, etc.), and any other aspect of the environmental lights that an environmental lighting control device will be asked to control. Other configuration actions may include, for example, connecting the video display device 300 to a network for receiving content items, establishing a communication connection between the video display device 300 and environmental lighting control device, connecting the environmental lighting control device to a network. The initial configuration may include determination of the lighting trigger processing capabilities of a device implementing the environmental lighting trigger control. If the device lacks image processing abilities, image-based triggers may be ignored. If the device is overloaded and processing is limited, the environmental lighting control may choose to only detect triggers that do not require extensive processing to detect (e.g., detecting command codes and pre-identified triggers, and perhaps omitting image matching).

In step 902, environmental lighting information 800 may be received. The environmental lighting information 800 may be downloaded as part of the initial configuration of the environmental lighting control device, and may be stored in a memory such as memory 203, 204, 205, etc. There may be different environmental lighting information 800 for different video programs, to allow different kinds of environmental lighting experiences. For example, movies, news programs, and series episodes may each be associated with their own environmental lighting information 800 indicating corresponding environmental lighting triggers and events. An action movie may have environmental lighting information 800 with more triggers based on gunfire and violence, while a comedic series may omit triggers based on gunfire and violence, and may instead have triggers based on recurring characters and happy emotions. The environmental lighting information 800 may be downloaded as the user selects different video content for viewing (e.g., channel surfing, selecting a program from a program listing, etc.). The environmental lighting information 800 may be downloaded in advance, such as during the initial configuration 901. The environmental lighting information 800 may be downloaded periodically, such as nightly, weekly, on demand in response to an update (e.g., a new advertising trigger is added), or according to any desired schedule.

The environmental lighting information 800 need not be specific to individual video programs. For example, there may be separate environmental lighting information 800 for different series of video programs (e.g., multiple episodes of a recurring dramatic series may be associated with a common environmental lighting information 800 for that series, while episodes of a different comedy series may have a common table 800 for that comedy series), or for different services (e.g., there may be separate tables 800 for NBC, ABC, CBS, ESPN, HBO, etc.). There may be different environmental lighting information 800 for different genres of content (e.g., one environmental lighting information 800 for horror movies, another environmental lighting information 800 for action movies, etc.). There may be different environmental lighting information 800 for different times of day or different days of the week (e.g., different user experiences may be desired if it is dark outside, cold outside, stormy, school nights, weekend, etc.). There may be different environmental lighting information tables 800 for different video display devices 300 and/or different environmental lighting capabilities. There may be different environmental lighting information 800 for individual users, and users may customize their backlight experience by selecting and/or defining trigger behaviors.

Multiple tables of environmental lighting information 800 may be relevant to a particular video device 300, and in step 902, these tables may be received and combined. In the event there are conflicting trigger events between the tables, there may be prioritization based on user preference as to which trigger will take effect.

A user may also select to create new custom triggers, and/or modify existing ones. For example, a parent may wish to be warned of upcoming scenes containing sexual content or violence, and may configure backlight triggers to provide that warning. If a user selects, in step 903, to create a custom trigger, in step 904, the user may be presented with an interface such as the trigger screen 1000 shown in FIG. 10, to establish environmental lighting trigger parameters for the custom trigger. This process for creating a new trigger may be made, for example, by invoking a user command using a remote control associated with the backlight control device and/or the video display 300, and the user interface 1000 may comprise options for setting any desired characteristic of the environmental lighting trigger and/or effect (including, but not limited to, the ones discussed below).

In step 904, the user may select a type of new trigger to create. The user may be prompted to select from a list of various available trigger types, such as those listed in table 800. The environmental lighting control device may obtain, such as from lighting server 122, information indicating available supported trigger types. The lighting server 122 may store information indicating keywords, image objects, sound patterns, and/or commands that may be recognized by the backlight control device. For example, if the user wishes to create a new lighting trigger to warn of a gun appearing onscreen, the lighting server 122 may store available image templates for recognizing guns, and may download that information to the environmental lighting control device to be used as a trigger parameter during image recognition for identifying triggers (as will be discussed further below). The lighting server 122 may similarly store audio patterns for sound/voice recognition, control codes for commands (e.g., SCTE-35 commands), and/or any other supporting information needed for recognition of a lighting trigger.

Figure 10:
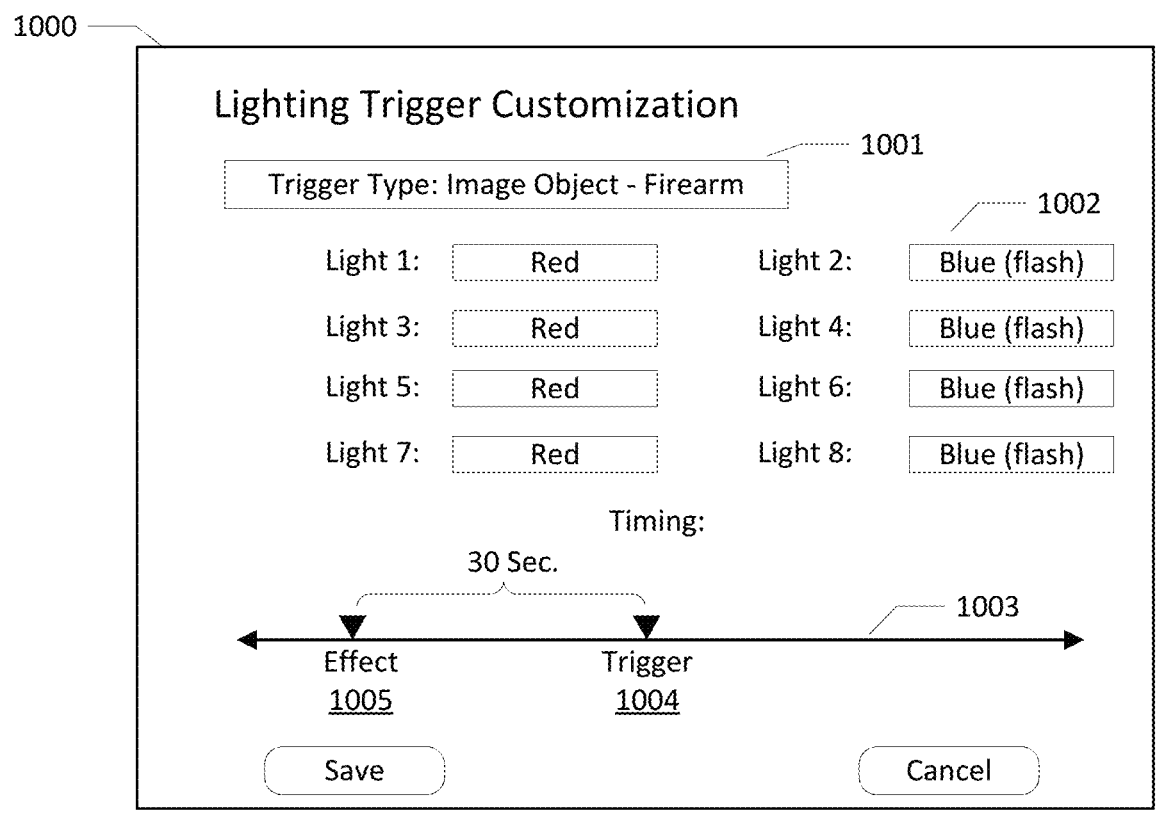
FIG. 10 shows an example of a lighting customization user interface.

In step 905, the user may select the desired backlight response that should occur when the lighting trigger is detected. As shown in FIG. 10, the user interface may include options 1002 for each of the environmental lights that are associated with the video display 300. For each environmental light, the user may select from a list of available lighting effects. The lighting effects may include colors, brightness, duration, flashing pattern, gradual illumination and gradual removal of illumination, and/or any other capability provided by the backlights. The user may set different environmental lights to have different effects. For example, the user may choose to have some of the environmental lights illuminate in a red color in response to the selected trigger (e.g., image recognition of a gun), while other environmental lights will flash in a blue color. Any desired combination of effects may be selected. A desired color backlight response may be based on a search for the trigger. The user may enter one or more terms, such as "Autumn," and a search (e.g., an Internet search, search of a current program being viewed, search of a user's personal photograph library, etc.) may be executed to retrieve one or more images (still and/or moving video). The user may select one or more of the search results, and the environmental lighting color effects may be determined based on colors found in the selected search results. Environmental light colors may be chosen to match colors found in the search results (e.g., if the user chooses an Autumn image showing orange and brown leaves, then orange and brown colors may be selected for the backlighting). The color locations may also be based on the selected search results. For example, if the user selects an Autumnal image showing brown and orange leaves under a blue sky, then the environmental lighting effect may be set to have blue lighting at the top and orange and brown in the middle.

The user may also indicate a desired timing for the environmental lighting effect. The user interface may provide a timeline 1003 with time indicators for the trigger 1004 and the desired effect 1005. The user may move the effect time indicator 1005 to adjust a quantity of time between the triggering event and the environmental lighting effect. In the FIG. 10 example, the user has chosen to have the effect 1005 begin 30 seconds before the trigger 1004, so 30 seconds before the gun appears onscreen in the content item, the environmental lights will begin to illuminate and flash per the effect setting. This may provide the user with an advance notice, should the user wish to exert parental control or take other action in view of the trigger. The environmental lighting effect may span the time duration between the effect 1005 and the trigger 1004. The user may be provided with an option of setting the duration of the effect, such as using the options 1002. Accordingly, the user could specify that the effect is to end when the lighting trigger occurred (e.g., end when the gun appears on screen), extend 10 seconds after the trigger, or any other desired duration. For example, a user may wish to have a pleasing color (e.g., green may be mapped to a "pleasant" emotion) appear in the background for 20 seconds after a romantic scene.

Other aspects of the lighting trigger and/or effect may also be established. For example, the user may provide information indicating program(s) for which the effect should be active, users for whom the effect should be active, time(s) of day that the effect should be active, whether the effect should be localized to appear proximate to an onscreen location of the detected trigger, etc.

After the user is satisfied with the new lighting trigger and effect, the user may choose to save the new settings, and the various user selections may be stored as parameters for backlight triggers. In step 906, the parameters indicating the new backlight trigger and effect may be added to the table 800. The parameters may be sent to an environmental lighting control device for use during a content viewing session. Environmental lighting parameters may also be uploaded for sharing with other users. For example, the user who creates a lighting response using the FIG. 10 interface may choose to upload parameters of the lighting response to a server, such as lighting server 122, and other users may download the environmental lighting parameters for use in their own systems. The lighting server 122 may maintain a library of various environmental lighting trigger and effect parameters, and users may search the library to find desired environmental lighting parameters to simplify the creation process. The environmental lighting parameters may be organized according to program genre (e.g., romances), specific programs (e.g., patterns for a particular sporting event, movie, comedy series, etc.), object pattern type, etc.

In step 907, a determination may be made as to whether a content item has been selected for output by the video display 300. The environmental lighting control device may be implemented on any desired computing device, such as personal computer 114, laptop computer 115, gateway 111, a DVR, etc. and may receive a message indicating that the user has selected a sporting event from a program listing, or by entering a service number (e.g., channel number) into a remote control. If a user is streaming a movie on laptop computer 115, environmental lighting control device may receive a message from a video streaming application, running on the laptop computer 115, indicating that the user has chosen to watch a movie using the streaming application.

If the user has not selected any content for output, the process may remain at step 907. If the user has selected content for output, in step 908, the environmental lighting information 800 (or portion thereof) that corresponds with the current viewing session may be retrieved and prepared for use. The selection of the environmental lighting information 800 (or portion thereof) may be based on the selected content item, the source of the content item, the device being used to output the video to the video display device 300, the video display device 300, the current day and/or time, an identity of the user (e.g., if the user logged in to a streaming application, or otherwise provided a user identification to obtain the selected content item), and/or any other relevant criterion for the environmental lighting information 800. For example, if it is Sunday evening and the user has chosen to watch an action movie from an online streaming service to stream the movie to the user's laptop 115 for output to a video display device 300, the retrieved environmental lighting information 800 may comprise environmental lighting trigger entries that have been indicated for use with action movies (and/or the specific chosen movie), environmental lighting trigger entries designated for use on Sunday evenings, environmental lighting trigger entries designated for use for the particular streaming service and/or the user account that the user is using to view the movie, and environmental lighting trigger entries designated for use with laptop 115.

In step 909, the selected content item may be output via the display device 300. For example, if the user is streaming the action movie via the laptop 115, the laptop 115 may begin to receive the movie content (e.g., audio and video) from a content source (e.g., content server 106), and may buffer the content in a memory, such as memory 203. The laptop 115 may begin to output audio/video signals to the video display device 300 after there is sufficient content buffered in the memory 203. The amount of content required before the audio/video signals are output to the display device 300 may be based on a variety of factors, including the amount of advance time needed for processing lighting trigger entries. For example, if an active lighting trigger entry calls for a 30-second backlight warning before an explosion is displayed, the laptop 115 may wait until it has buffered at least 30 seconds' worth of the movie before it begins to output the audio/video signals to the video display 300. A longer amount of buffer time may be useful to allow time for actual processing of the audio/video signals, transmission delays, and other sources of delay. For example, if the content item is a video on demand or other pre-recorded content, some of the trigger detection (e.g., recognizing audio patterns, video patterns, etc.) may be prepared prior to the user's viewing session, and corresponding information may be delivered along with the content item. Such pre-processed lighting triggers may be detected simply by receiving information, such as in a data file accompanying the content item, indicating triggers that have already been detected in the content item. For example, a video program metadata may indicate that a tree was detected at the upper-left corner of the video at time 09:55 in a movie. For such pre-processed content, a shorter buffer may be sufficient. However, if the content item has not been preprocessed (e.g., a live sporting event), a longer buffer may be desired to allow for more time to dynamically perform the lighting trigger detection.

After the buffering of the content has begun, the content may be processed to detect lighting triggers. For example, the laptop 115 may implement environmental lighting controls, and may process the buffered content and determine whether any lighting triggers are detected. In step 910, a determination may be made as to whether any video lighting triggers have been detected in the buffered content. For example, the laptop 115 may perform an image matching process on the buffered video content to determine whether any frames of the buffered video content comprise a video trigger object (e.g., trees, computer, car, facial emotion, scene type, etc.) from environmental lighting information 800.

If any video lighting triggers are detected, environmental lighting settings may be adjusted, in step 911, to reflect the effect(s) indicated in the environmental lighting information 800. For example, if a detected lighting trigger calls for environmental light 303b to illuminate a green light, color settings corresponding to that environmental light 303b may be adjusted to cause the environmental light to emit green light. If the video trigger called for a 30-second advance warning, the environmental lighting settings may be updated to indicate a start and/or stop time for the environmental lighting warning to occur. The environmental lighting settings may indicate current light settings as well as future scheduled settings (e.g., indicating colors for specific environmental lights, and time(s) when those colors should be illuminated). The adjustment of environmental lighting settings need not immediately result in a change in the actual illumination. The recognition of other lighting triggers (discussed below) may alter and/or override some recognized lighting triggers.

In step 912, a similar lighting trigger detection process may be performed, but for audio triggers instead of video triggers. For example, the laptop 115 may compare audio patterns indicated in environmental lighting information 800 with buffered audio content, to determine whether the buffered audio contains any matches with the trigger audio patterns. If any audio lighting triggers are detected in the buffered audio (e.g., the sound of an explosion is detected in buffered audio), the corresponding environmental lighting settings may be updated in step 913.

Steps 914 and 915 similarly determine whether environmental lighting commands have been received, and update the environmental lighting settings for any detected environmental lighting commands. As noted above, lighting triggers can be in the form of commands that may be received with (and/or within) the content, such as in an SCTE-35 command stream, or an MPEG (Moving Pictures Expert Group) command stream. The use of such commands may be beneficial for reducing processing load on backlight control devices (e.g., if image processing poses too much of a burden on the laptop's 115 available processing resources). Some commands may be codes indicating scene types, as discussed above. Some commands may indicate specific environmental light positions (e.g., illumination 302*b*), colors for those positions (e.g., green), times for those positions (e.g., 5:05 to 5:10), patterns (e.g., flash illumination on and off every 0.5 second), etc.

As noted above, the updating of the environmental lighting settings need not result in an immediate change to the environmental lighting. Some settings may be scheduled to take future effect. It may also be possible that different triggers will call for conflicting changes to the environmental light (e.g., one trigger calls for a light to be blue, while a different one calls for it to be red). The environmental lighting control device may employ prioritization to resolve such conflicts. In step 916, the environmental lights may be controlled to provide any required illumination based on the detected lighting triggers and/or commands, and the updated environmental lighting settings.

The trigger detection process may continuously operate while the content item is being output by the video display device 300, and additional content may be continuously received as well. If, in step 917, the content item has not ended, the process may return to step 910 to examine the latest buffered content for new lighting triggers, and the process may repeat.

By providing the environmental lighting illumination described herein, a user may realize a variety of advantages. The user may be given advanced warning of upcoming content, which may be useful for parental control. The user may be provided with an enhanced visual effect matching the content the user is watching, and this may make the content more engaging. A user who is quickly browsing content items (e.g., changing channels, channel surfing, etc.) may be provided with context of a current content item (e.g., backlighting indicating a romance scene) to assist in quickly deciding whether to remain and view the content item or switch to another content item. Advertisers may provide additional revenue to content providers and/or to users if environmental lighting illumination is used to show the advertiser's colors when the advertiser's product or logo appears onscreen.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device, video content;
performing object recognition on one or more images of the video content, wherein the object recognition comprises distinguishing foreground and background objects; and
causing, based on the object recognition and while the video content is being displayed by a display device, illumination, in one or more colors that are selected based on a color of a recognized background object, of one or more environmental lights providing illumination behind the display device.

2. The method of claim 1, wherein the illumination illuminates an area, behind the display device, that is selected based on a location of an object recognized by the object recognition.

3. The method of claim 1, further comprising selecting the one or more colors to match a color of an object that was recognized by the object recognition.

4. The method of claim 1, wherein the object recognition comprises text recognition, and the method further comprises causing illumination, at an area behind the display device and adjacent to recognized text on the display device, of one or more colors that are selected based on a color of the recognized text.

5. The method of claim 1, wherein the object recognition comprises image pattern recognition, and the method further comprises causing illumination, at an area behind the display device and adjacent to a recognized image pattern on the display device, of one or more colors that are selected based on a color of the recognized image pattern.

6. The method of claim 1, further comprising scheduling the illumination of the one or more environmental lights to occur at a time before a recognized object appears on a screen of the display device.

7. The method of claim 1, wherein the video content comprises a movie recorded by a digital video recorder (DVR), the method further comprising performing audio pattern recognition on audio associated with the movie, and wherein the causing illumination is further based on the audio pattern recognition.

8. The method of claim 1, further comprising performing speech recognition on audio associated with the video content, and wherein the causing illumination is further based on the speech recognition.

9. The method of claim 1, further comprising receiving trigger parameters for environmental lighting illumination, wherein the trigger parameters indicate:
an audio or video pattern for triggering environmental lighting illumination; and
color for the one or more environmental lights, and
wherein the object recognition is based on the trigger parameters.

10. The method of claim 1, further comprising:
associating different areas of the display device with different corresponding environmental lights; and
selecting the one or more environmental lights based on an area, of the display device, corresponding to an object recognized by the object recognition.

11. The method of claim 1, wherein the video content comprises a video program selected from a program listing and received from a content server remote from the computing device.

12. The method of claim 1, wherein the causing illumination comprises causing illumination of a wall behind the display device.

13. An apparatus comprising:
one or more processors; and
memory storing instructions that, when executed by the one or more processors, configure the apparatus to:
receive video content;
perform object recognition on one or more images of the video content, wherein the object recognition comprises distinguishing foreground and background objects; and
cause, based on the object recognition and while the video content is being displayed by a display device, illumination, in one or more colors that are selected based on a color of a recognized background object, of one or more environmental lights providing illumination behind the display device.

14. The apparatus of claim 13, wherein the illumination illuminates an area, behind the display device, that is selected based on a location of an object recognized by the object recognition.

15. The apparatus of claim 13, wherein the instructions, when executed by the one or more processors, further configure the apparatus to select the one or more colors to match a color of an object that was recognized by the object recognition.

16. The apparatus of claim 13, wherein the object recognition comprises text recognition, and the instructions, when executed by the one or more processors, further configure the apparatus to cause illumination, at an area behind the display device and adjacent to recognized text on the display device, of one or more colors that are selected based on a color of the recognized text.

17. The apparatus of claim 13, wherein the object recognition comprises image pattern recognition, and the instructions, when executed by the one or more processors, further configure the apparatus to cause illumination, at an area behind the display device and adjacent to a recognized image pattern on the display device, of one or more colors that are selected based on a color of the recognized image pattern.

18. The apparatus of claim 13, instructions, when executed by the one or more processors, further configure the apparatus to schedule the illumination of the one or more environmental lights to occur at a time before a recognized object appears on a screen of the display device.

19. The apparatus of claim 13, wherein the video content comprises a movie recorded by a digital video recorder (DVR), and wherein the instructions, when executed by the one or more processors, further configure the apparatus to perform audio pattern recognition on audio associated with the movie and cause the illumination further based on the audio pattern recognition.

20. The apparatus of claim 13, wherein the instructions, when executed by the one or more processors, further configure the apparatus to perform speech recognition on audio associated with the video content and cause the illumination further based on the speech recognition.

21. The apparatus of claim 13, wherein the instructions, when executed by the one or more processors, further configure the apparatus to receive trigger parameters for environmental lighting illumination, wherein the trigger parameters indicate:
an audio or video pattern for triggering environmental lighting illumination; and
color for the one or more environmental lights; and
wherein the object recognition is based on the trigger parameters.

22. The apparatus of claim 13, wherein the instructions, when executed by the one or more processors, further configure the apparatus to:
associate different areas of the display device with different corresponding environmental lights; and
select the one or more environmental lights based on an area, of the display device, corresponding to an object recognized by the object recognition.

23. The apparatus of claim 13, wherein the video content comprises a video program selected from a program listing and received from a content server remote from the apparatus.

24. The apparatus of claim 13, wherein the instructions, when executed by the one or more processors, configure the apparatus to cause the illumination by causing illumination of a wall behind the display device.

25. One or more non-transitory computer readable medium storing instructions that, when executed, cause:
receiving, by a computing device, video content;
performing object recognition on one or more images of the video content, wherein the object recognition comprises distinguishing foreground and background objects; and
causing, based on the object recognition and while the video content is being displayed by a display device, illumination, in one or more colors that are selected based on a color of a recognized background object, of one or more environmental lights providing illumination behind the display device.

26. The one or more non-transitory computer readable medium of claim 25, wherein the illumination illuminates an area, behind the display device, that is selected based on a location of an object recognized by the object recognition.

27. The one or more non-transitory computer readable medium of claim 25, wherein the instructions, when executed, further cause selecting the one or more colors to match a color of an object that was recognized by the object recognition.

28. The one or more non-transitory computer readable medium of claim 25, wherein the object recognition comprises text recognition, and the instructions, when executed, further cause illumination, at an area behind the display device and adjacent to recognized text on the display device, of one or more colors that are selected based on a color of the recognized text.

29. The one or more non-transitory computer readable medium of claim 25, wherein the object recognition comprises image pattern recognition, and the instructions, when executed, further cause illumination, at an area behind the display device and adjacent to a recognized image pattern on the display device, of one or more colors that are selected based on a color of the recognized image pattern.

30. The one or more non-transitory computer readable medium of claim 25, wherein the instructions, when executed, further cause scheduling the illumination of the one or more environmental lights to occur at a time before a recognized object appears on a screen of the display device.

31. The one or more non-transitory computer readable medium of claim 25, wherein the video content comprises a movie recorded by a digital video recorder (DVR) and the instructions, when executed, further cause performing audio pattern recognition on audio associated with the movie, and wherein the causing illumination is further based on the audio pattern recognition.

32. The one or more non-transitory computer readable medium of claim 25, wherein the instructions, when executed, further cause performing speech recognition on audio associated with the video content, and wherein the causing illumination is further based on the speech recognition.

33. The one or more non-transitory computer readable medium of claim 25, wherein the instructions, when executed, further cause receiving trigger parameters for environmental lighting illumination, wherein the trigger parameters indicate:
an audio or video pattern for triggering environmental lighting illumination; and
color for the one or more environmental lights; and
wherein the object recognition is based on the trigger parameters.

34. The one or more non-transitory computer readable medium of claim 25, wherein the instructions, when executed, further cause:
   associating different areas of the display device with different corresponding environmental lights; and
   selecting the one or more environmental lights based on an area, of the display device, corresponding to an object recognized by the object recognition.

35. The one or more non-transitory computer readable medium of claim 25, wherein the video content comprises a video program selected from a program listing and received from a content server remote from the computing device.

36. The one or more non-transitory computer readable medium of claim 25, wherein the causing illumination comprises causing illumination of a wall behind the display device.

\* \* \* \* \*